Feb. 2, 1965
L. MILTON ETAL
3,168,631
THERMAL CIRCUIT INTERRUPTING DEVICE HAVING
COLLINEAR SPACED CONDUCTORS
Filed March 28, 1960
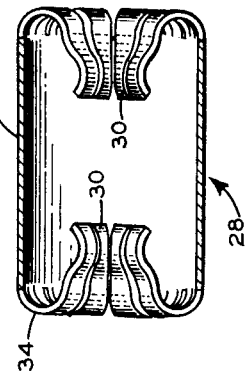
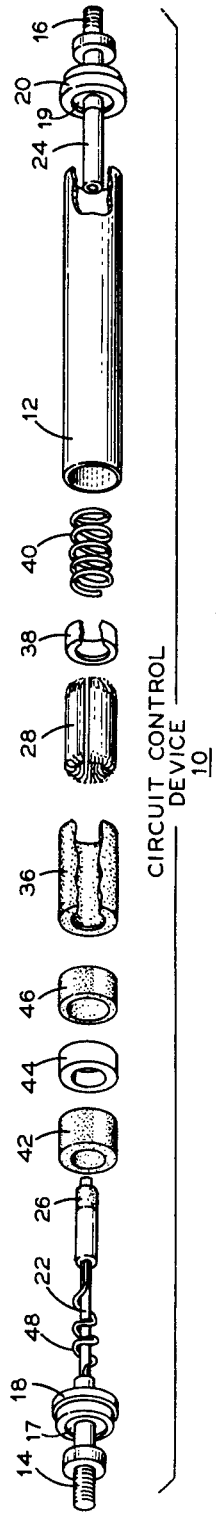
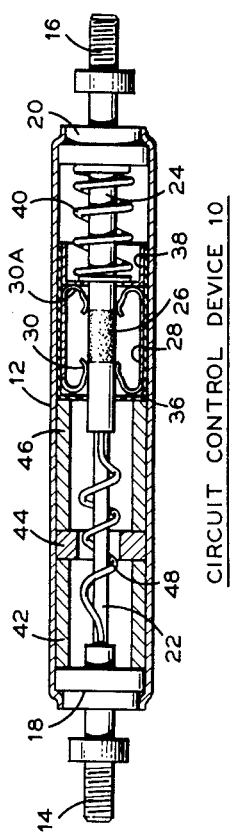
INVENTORS
Leonard Milton
John S. Lory
BY S.C. Yuter
ATTORNEY United States Patent Office 3,168,631
Patented Feb. 2, 1965

3,168,631
THERMAL CIRCUIT INTERRUPTING DEVICE HAVING COLLINEAR SPACED CONDUCTORS
Leonard Milton, Lake Success, and John S. Lory, Syosset, N.Y., assignors to The Filtron Company, Inc.
Filed Mar. 28, 1960, Ser. No. 18,041
3 Claims. (Cl. 200—122)

This invention pertains to circuit control devices and more particularly to thermal circuit breakers.

Although there are many devices for controlling the flow of electrical energy to an electrical circuit, most of these devices contain fusible links through which the electrical current flows. Such devices have only broad ranges of tolerances. Therefore, current interruption at very precise temperatures is extremely difficult. In addition to the difficulty in obtaining precision, there is the further problem of providing reproducible units having uniform characteristics. The devices which have any degree of precision and reproducibility are generally very complex, bulky and expensive.

Furthermore, such devices either monitor current flow to the circuit so that when the current exceeds a predetermined value the circuit is broken, or if the ambient temperature rises beyond a certain value, the circuit is similarly interrupted. However, there are many current control applications which require the simultaneous monitoring of the magnitude of current and the ambient temperature. For example, in many airborne and space systems the allowable current flow to a circuit may be one magnitude when the ambient temperature is a first value and a different magnitude when the ambient temperature is a second and different value.

It is, accordingly, a general object of the invention to provide an improved circuit control device.

It is another general object of the invention to provide an improved circuit breaker which is sensitive to the ambient temperature.

It is another object of the invention to provide an improved circuit control device which is simultaneously sensitive to the magnitude of current flow and the ambient temperature.

It is a further object of the invention to provide an improved thermal circuit breaker which will interrupt current flow to a circuit when the current exceeds a predetermined value which is between the range of less than one ampere to greater than one hundred amperes.

It is a still further object of the invention to provide an improved thermal circuit breaker which will interrupt the flow of current to a circuit when the ambient temperature exceeds a predetermined value from below one hundred twenty-five degrees to over one thousand degrees Fahrenheit.

It is a still further object of the invention to provide an improved thermal circuit breaker which will interrupt the flow of current to a circuit only when predetermined combinations of ambient temperature and current flow exist.

It is yet another object of the invention to provide reliable thermal circuit breakers which are the same size for a very broad range of temperature and current sensitivity.

In general, in accordance with one embodiment of the invention, a circuit control device is provided which includes first and second conductors that are in a predetermined spaced relationship such as collinear. A conductive bridging means which is axially movable along the conductors is provided to complete a circuit from the first to the second conductor. Means are included to urge the conductive bridging means out of contact with at least one of the conductors. Means which becomes non-rigid at a predetermined temperature oppose the axial movement of the conductive bridging means.

In accordance with another embodiment of the invention, a heating means which receives current from one of the conductors is included to generate heat in accordance with the magnitude of the current flowing through the conductors.

A feature of the invention is a conductive bridging means whose construction minimizes the contact resistances between the conductors and the conductive bridging means.

Other objects, features and advantages of the invention will be apparent from the following detailed description when read with the accompanying drawing wherein:

FIGURE 1 is an exploded view, in perspective, of a circuit control device in accordance with a preferred embodiment of the invention which includes first and second conductors and a conductive bridging means for contacting the conductors;

FIGURE 2 is a longitudinal sectional view of the circuit control device of FIGURE 1 as assembled; and FIGURE 3 is a longitudinal section of the conductive bridging means of FIGURES 1 and 2.

Referring to FIGURES 1 and 2, a circuit control device 10 is shown in accordance with a preferred embodiment of the invention. The circuit control device 10 includes a cylindrical housing 12 with a pair of feed-thru terminals 14 and 16 respectively extending from opposite ends of the cylindrical housing 12. In general, the terminal 14 may be connected to a source of electrical current and the terminal 16 may be connected to a utilization circuit such as a motor.

A first elongated conductor 22 extends axially inward through the center insulative portion 17 of end wall closure 18 of the cylindrical housing 12. The end of elongated conductor 22 in the region of the end wall 18 is electrically connected to the terminal 14. Similarly, an elongated conductor 24 extends axially inward through the center insulative portion 19 of end wall closure 20. The end of the elongated conductor 24 in the region of the end wall 20 is connected to the terminal 16.

More particularly, the elongated conductors 22 and 24 are collinearly disposed with an axial gap or space between their ends remote from the end walls closures 18 and 20. Disposed in the axial gap is an insulative element 26 having a cross-section similar to the cross-sections of the elongated conductors 22 and 24. Thus, a mechanically continuous line extends from the elongated conductor 22 to the elongated conductor 24. However, because of the presence of the insulative element 26, there is no electrical connection between the terminals 14 and 16.

To provide an electrical connection between the terminals 14 and 16, a conductive bridging means or contact spring 28 is positioned to simultaneously contact the elongated conductor 22 and the elongated conductor 24. The contact spring 28 is primarily a hollow cylinder having a plurality of tines, such as the tine 30 in FIGURE 3. The typical tine 30 extends from the body portion 32 of the contact spring 28 in a radial direction, and includes an inwardly directed bend 34, so that the end portion of the tine 30 is substantially parallel to the axis of the contact spring 28. The bend 34 of the tine 30 is of such a degree as to provide a good contact between the end of the tine 30 and the elongated conductor 22. Contact spring 28 is axially movable along the line formed by the elongated conductors 22 and 24 with the insulative element 26. When the contact spring 28 is in the position shown in FIGURE 2, an electrical path is established between the terminals 14 and 16. However, when the contact spring 28 is axially displaced so that one of the sets of tines 30 is out of contact with its associated elongated conductor, the circuit between the terminals 14 and 16 is broken. For example, if the contact spring 28 is displaced to the left so that the set of tines at the right-hand end (FIG. 2) are in contact with the insulative element 26 or with the elongated conductor 22, the electrical path between the terminals 14 and 16 is opened.

Contact spring 28 is disposed in a spring container or basket 36 of insulative material which is provided with a cup-shaped spring seat 38 of insulative material. Disposed between spring seat 38 and the end wall closure 20 is a loading spring 40 for urging the contact spring 28 to move out of the bridging relation between the elongated conductors 22 and 24. To prevent this axial movement of the contact spring 28, there is disposed between the end wall closure 18 and the base of the spring container 36 the hollow cylindrical spacer 42, the hollow cylindrical detent element 44 and the hollow cylindrical spacer 46. The total axial length of these three elements is such as to insure that the contact spring 28 bridges the insulative element 26 to engage the elongated conductors 22 and 24. Hollow cylindrical spacers 42 and 46 are preferably of insulative material, though they can be of other material suitable for spacing.

The hollow cylindrical detent element 44 is of a material which softens at a predetermined temperature. The length of the hollow cylindrical detent element 44 is such that when it softens or melts, loading spring 40 can urge the contact spring 28 to move a sufficient distance such that a set of tines, such as the set including tine 30A, completely moves out of contact with the end of the elongated conductor 24.

The circuit control device 10, as described up to this point, is therefore capable of interrupting the electrical circuit between the terminals 14 and 16 whenever the ambient temperature rises to a value which causes the detent element 44 to soften or melt. It should be noted that the composition of the material in the hollow cylindrical detent element 44 can be varied to provide any predetermined melting point from at least 125° to 1,000° F. However, in addition to providing a control which is responsive to ambient temperature, the circuit control device 10 can provide a control which is responsive to the current passing between the terminals 14 and 16.

In particular, a heating element 48 which is a helical coil of resistance wire is connected in parallel with a portion of the elongated conductor 22. Thus, as long as current passes between the terminals 14 and 16, a portion of the current flows through the heating element 48. By a suitable choice of the material in the heating element 48 and by properly choosing its dimensions, the ohmic heat developed when the desired current flows through the terminals 14 and 16 is insufficient to melt the hollow cylindrical detent element 44. However, when the flow of current exceeds the predetermined amount, the ohmic heating increases to cause the hollow cylindrical detent element 44 to melt.

It should be noted that the hollow cylindrical detent element 44 receives heat from two sources: that is, from the environment about the circuit control device 10 plus the heat generated by the heating element 48. It is therefore possible, by choosing the proper composition of the material in hollow cylindrical detent element 44 and the resistance characteristic of the heating element 48, to insure that the circuit between the terminals 14 and 16 is not broken until a particular ambient temperature and a particular current flow exist.

In assembling the control device 10, a first subassembly is formed by developing the heating element 48 about the elongated conductor 22 and brazing the ends to the elongated conductor 22. One end of the elongated conductor 22 is passed through a hole in the end wall closure 18 to become the terminal 14. Spacer 42, detent element 44 and spacer 46 are threaded onto the elongated conductor 22. A second subassembly is formed by passing one end of elongated conductor 24 through a hole in the end wall closure 20 to provide a terminal 16. Loading spring 40 is then threaded onto elongated conductor 24. Contact spring 28 is placed within spring container 36 and spring container 36 is closed by positioning the spring container 38 over its exposed end. The contact spring and container assembly is then threaded onto elongated conductor 24. Insulative element 26 is fitted into the end of elongated conductor 24 and the second subassembly is complete. The other end of insulative element 26 is fitted into the end of elongated conductor 22 and the whole structure is maintained in a fixed axial position. The case 12 is slid over the entire axial array, and a spinning operation is performed on the ends of the case 12 so that they overlap portions of the respective end walls closures 18 and 20. Hermetic sealing of the unit may be accomplished by use of solder or brazing alloys to solder or braze the end walls closures 18 and 20 to the housing 12, or welding the end walls 18 and 20 to the housing 12, or by placing a gasket or O-ring between the end walls closures 18 and 20 and the housing 12 and mechanically spinning or crimping 12 as shown in FIGURE 2.

In a specific example of an embodiment of the invention which will interrupt current flow at a current of 50 amperes or an ambient temperature of 279° F., the heating element 48 is made from nichrome wire and the detent element 44 is formed from benzoylphenylcarbinol. For current interruption at a somewhat higher temperature, the detent element 44 may be formed from O-hydroxybenzoic acid.

It is understood that other materials may be used in making detent element 44, each material providing current interrupting means related to its specific melting point. In other words, the material is adapted to become non-rigid at a predetermined temperature thereby producing a condition which premits axial movement of the contact spring 28.

There has thus been shown an improved control device which is simultaneously sensitive to the magnitude of current flow and to the ambient temperature. This simultaneous sensitivity over a broad combination of temperatures and currents is possible because of the use of a rigid element which opposes the movement of a conductive bridging means with respect to a pair of conductors. The detent element which melts at a predetermined temperature is responsive to a heating element that generates heat in accordance with the current flow, and is also responsive to the ambient temperature.

There will now be obvious to those skilled in the art many modifications and variations which satisfy the objects and which obtain many advantages, but which do not depart from the spirit of the invention as defined in the claims which follow.

What is claimed is:

1. A circuit-interrupting device comprising
    an elongated cylindrical housing;
    a closure co-axially supported on the housing at each end of said housing;
    a feed-through terminal co-axially supported on each closure;
    a first electrical conductor electrically insulated from and supported on one of said closures and electrically connected to the associated terminal;
    a second electrical conductor electrically insulated from and supported on the second of said closure and electrically connected to the associated terminal;
    an insulating spacer disposed between and secured to the first conductor and the second conductor, with all said three elements disposed and secured in linear axial alignment to constitute a fixed rigid linear structure supported between said two terminals;
    a conducting bridging member dimensioned to bridge the insulating spacer and to engage the two electrical conductors when said bridging member is in operative position, and movable axially to a non-operating position to disengage one of said electrical conductors;

a compression spring normally compressed and positioned to impress an axial displacing force on said bridging member tending to move said bridging member from operative to non-operative position;

thermally-responsive detent means disposed to be normally effective in the line of movement of said bridging member to counteract the displacing force of said compression spring and to hold said conducting bridging member in operative position; and means for thermally acting on said detent means to render said detent means ineffective to counteract said spring means, and thereupon to permit said spring means to move said bridging member from operative to non-operative position.

2. A circuit interrupting device for controlling the operating current to a load circuit comprising a longitudinal cylindrical housing having two end wall closures, one anchored at each respective end of the housing, with a thru terminal extending thru and anchored on each end wall closure, first and second elongated conductors co-axially disposed in axially spaced relation, with an insulative element disposed in the axial space between said first and second elongated conductors, said conductors and said insulative element being secured in such axial linear alignment to constitute a fixed rigid structure supported co-axially from and between said two end wall closures, a bridging means of conductive material in co-axially movable contact with said first and second elongated conductors, means for urging said bridging means to axially move out of contact with one of said elongated conductors, and temperature responsive detent means normally rigid in the path of said bridging means for opposing axial movement of said bridging means at ambient temperatures corresponding to normal load circuit current; and means effective, at excess load currents, to raise the ambient temperature and the temperature of said detent means to render said detent means non-rigid at a predetermined temperature for permitting the axial movement of said bridging means.

3. A circuit interrupter device for controlling the operating current to a load circuit comprising a cylindrical housing with co-axial end wall closures, first and second elongated conductors coaxially disposed in said housing in axially spaced relation, an insulative member having a cross-section similar to the cross-section of said elongated conductors, said insulative member being disposed in the axial space between said first and second elongated conductors and rigidly secured to said first and second conductors for providing a mechanically rigid and continuous structure and line between said first and second conductors, a hollow cylindrical bridging means axially movable along said mechanically continuous line, a plurality of re-entrant tines extending radially inward from the ends of said hollow cylindrical bridging means, each of said tines having a bend so as to continue in an axial direction for slidably contacting one of said elongated conductors, an insulative basket concentrically supported within the cylindrical housing and co-axially movable in said housing, said basket enclosing and supporting said hollow bridging means for co-axial movement of said bridging means on said first and second conductors, means between one end wall closure and said basket for urging said basket and said hollow cylindrical bridging means to move said bridging means axially out of contact with at least one of said elongated conductors, a resistive heating means in said housing and in parallel circuit relation with one of said elongated conductors, and a rigid cylinder disposed about said resistive means for normally opposing axial movement of said basket and said hollow cylindrical bridging means, said rigid cylinder being of a material which softens at a predetermined temperature in response to said heating means to thereupon permit axial movement of said hollow cylinder.

References Cited in the file of this patent
UNITED STATES PATENTS

| | | |
|---|---|---|
| 1,722,511 | Vansickle | July 30, 1929 |
| 1,875,179 | Prouty | Aug. 30, 1932 |
| 2,229,504 | Hoye | Jan. 21, 1941 |
| 2,331,778 | Hill | Oct. 12, 1943 |
| 2,657,294 | Laing | Oct. 27, 1953 |
| 2,665,349 | Sander | Jan. 5, 1954 |
| 2,821,602 | Hordechuck | Jan. 28, 1958 |
| 2,859,307 | Enk | Nov. 4, 1958 |

FOREIGN PATENTS

| | | |
|---|---|---|
| 425,492 | Great Britain | Mar. 15, 1935 |
| 558,199 | Great Britain | Dec. 24, 1943 |